United States Patent
Shirai et al.

(10) Patent No.: US 10,486,561 B2
(45) Date of Patent: Nov. 26, 2019

(54) LOCK RELEASE LEVER ATTACHMENT STRUCTURE

(71) Applicant: NHK SPRING CO., LTD., Yokohama-shi, Kanagawa (JP)

(72) Inventors: Jun Shirai, Yokohama (JP); Koji Matsuyama, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 94 days.

(21) Appl. No.: 15/905,610

(22) Filed: Feb. 26, 2018

(65) Prior Publication Data
US 2018/0257520 A1 Sep. 13, 2018

(30) Foreign Application Priority Data
Mar. 10, 2017 (JP) .................. 2017-046529

(51) Int. Cl.
*A47C 7/24* (2006.01)
*A47C 31/02* (2006.01)
*B60N 2/36* (2006.01)

(52) U.S. Cl.
CPC .................. *B60N 2/366* (2013.01)

(58) Field of Classification Search
CPC .. B60N 2/5825; B60N 2/5841; B60N 2/5883; B60N 2/6009; B60N 2/68; B60N 2/20; B60N 2/22; B60N 2/12; B60N 2/2821; B60N 2/2013; B60N 2/919; B60N 2/682; B60N 2/90; B60N 2/366; B60N 2/933; B60N 2/06; A47C 7/00
See application file for complete search history.

(56) References Cited

U.S. PATENT DOCUMENTS

| | | | | |
|---|---|---|---|---|
| 8,376,459 B2* | 2/2013 | Kumazaki | ................ | B60N 2/12 297/341 |
| 8,985,691 B2* | 3/2015 | Tsuruta | ................ | B60N 2/2356 297/331 |
| 10,202,057 B2* | 2/2019 | Makita | .................... | A47C 31/02 |
| 2012/0200127 A1* | 8/2012 | Nagasawa | ............... | B60N 3/108 297/188.13 |
| 2014/0110986 A1* | 4/2014 | Yamaguchi | ............... | B60N 2/68 297/378.1 |
| 2016/0107553 A1* | 4/2016 | Imajo | ....................... | B60N 2/68 297/452.18 |
| 2018/0037144 A1* | 2/2018 | Makita | .................... | A47C 31/02 |

FOREIGN PATENT DOCUMENTS

JP          2016-155400 A      9/2016

* cited by examiner

*Primary Examiner* — Shin H Kim
(74) *Attorney, Agent, or Firm* — Knobbe, Martens, Olson & Bear, LLP (57) ABSTRACT

A lock release lever attachment structure includes: a case that includes a case body, an upper portion of which opens as a first opening, and a first flange, a slit being formed to penetrate through at least a portion of the first flange in a seat up-down direction along a peripheral edge of the first opening; an operation lever that releases a locked state of a seatback; and a cover that includes a cover body, an upper portion of which opens as a second opening, and a second flange, the first and second openings being placed in communication by inserting the cover body into the case body through the first opening and fixing the cover body inside the case body, and an edge of a covering material that covers a surface of the seatback being inserted into the slit and gripped by the first and the second flanges.

6 Claims, 8 Drawing Sheets

LOCK RELEASE LEVER ATTACHMENT STRUCTURE

CROSS-REFERENCE TO RELATED APPLICATION

This application is based on and claims priority under 35 USC 119 from Japanese Patent Application No. 2017-046529 filed on Mar. 10, 2017, the disclosure of which is incorporated by reference herein.

BACKGROUND

Technical Field

The present disclosure relates to a lock release lever attachment structure.

Related Art

In recent times, lock release lever attachment structures have been provided in which an operation lever provided at a seatback shoulder is operated to release a locked state of a latch to a striker, disposed on a vehicle body, by actuating a rod that is coupled to the operation lever and the latch. The operation lever provided at the seatback shoulder may have a structure including a case that rotatably supports the operation lever and that is open at an upper portion, and a cover that covers the case by nipping an edge of a covering material. In such cases, when, for example, an occupant presses the periphery of a seatback cover, deformation of a pad might cause the position of the covering material to slip, exposing the internal structure of the cover or the case to the exterior.

Japanese Patent Application Laid-Open (JP-A) No. 2016-155400, for example, proposes a structure to prevent the position of a covering material from slipping in this manner.

Namely, in the proposed structure, an anchor member joined to an edge of the covering material is inserted into a slit provided in a sidewall of a base member, and is pushed out to a back side to anchor the edge of the covering material to the base member. Pre-fixing the edge of the covering material in this manner facilitates assembly of a covering material restraint member attached to the operation lever.

The structure described in JP-A No. 2016-155400 has the disadvantage of increasing the number of components, for example due to joining an anchor member to the edge of the covering material. Due to the addition of a complicated task of inserting the anchor member joined to the edge of the covering material into the slit formed in the sidewall of the base member and anchoring the anchor member to the slit, there is still room for improvement in work efficiency.

SUMMARY

In consideration of the above circumstances, the present disclosure provides a lock release lever attachment structure capable of reliably preventing internal structure from being exposed, while avoiding an increase in the number of components and a detrimental impact on the work efficiency.

A first aspect of the present disclosure provides a lock release lever attachment structure including:

a case that includes a substantially box-shaped case body, an upper portion of which opens as a first opening, and a first flange formed extending outward from the first opening, a slit being formed so as to penetrate through at least a portion of the first flange in a seat up-down direction along a peripheral edge of the first opening, and the case being attached to a bracket provided to a seatback frame such that the first opening is open in a seat upward direction;

an operation lever that is axially supported so as to be capable of swinging between a pair of sidewalls of the case body and that releases a locked state of a seatback by being swing-operated; and a cover that includes a substantially box-shaped cover body, an upper portion of which opens as a second opening and that restricts a swing range of the operation lever, and a second flange formed extending outward from a peripheral edge of the second opening, the first opening and the second opening being placed in communication with each other by inserting the cover body into the case body through the first opening and fixing the cover body inside the case body, and an edge of a covering material that covers a surface of the seatback being inserted into the slit and gripped by the first flange and the second flange.

In this lock release lever attachment structure, the case that includes the case body formed with the first opening at the upper portion is attached to the bracket provided to the seatback frame. The operation lever is attached between the pair of sidewalls of the case body so as to be capable of swinging to release the locked state of the seatback. The case is also provided with the first flange formed extending outward from a peripheral edge of the first opening. During assembly, the edge of the covering material is inserted into the slit formed in the first flange. The cover body of the cover is inserted into the first opening of the case, and the cover is fixed to the case, such that the (edge of) the covering material inserted into the slit is gripped by the first flange and the second flange. Namely, the edge of the covering material passes between the first flange and the second flange and is inserted downward through the slit.

Accordingly, the edge of the covering material is prevented from being pulled out from below the second flange of the cover so as to expose the internal structure, even when the covering material of the seatback is pressed downward at a position at the periphery of the second flange of the cover, pulling and moving the covering material somewhat. Moreover, a sufficient length of the edge of the covering material is positioned at the lower side of the second flange of the cover, even when a pad disposed inside the covering material elastically deforms downward together with the covering material. This thereby prevents the internal structure from being exposed to the exterior.

Moreover, this attachment structure can be achieved simply by providing the slit in the first flange of an existing case, and inserting the edge of the covering material into the slit. An increase in the number of components in comparison to existing products and a detrimental impact on the work efficiency is thus suppressed.

A second aspect of the present disclosure provides the lock release lever attachment structure of the first aspect, wherein the slit is formed in the first flange at both end sides of a swing shaft of the operation lever.

In this lock release lever attachment structure, the slit is formed in the first flange at both end sides of the swing shaft of the operation lever. Namely, there is an issue regarding being unable to insert a sufficient length of the edge of the covering material into the first opening in the case due to interference with the swing shaft at the portions where the operation lever is attached to the case so as to be capable of swinging.

However, providing the slit to first flange at the above portions enables a sufficient length of the edge of the covering material to be inserted downward through the slit.

This thereby enables the internal structure to be reliably prevented from being exposed when downward load acts on the covering material at the periphery of the cover of the seatback.

A third aspect of the present disclosure provides the lock release lever attachment structure of the first aspect, wherein a width of the first flange is wider than a width of the second flange at a portion of the second flange overlapping the first flange.

In this lock release lever attachment structure, (an edge of) the first flange of the case having a wider width than the second flange is positioned below the covering material (and pad) positioned at the periphery of the second flange of the cover that is exposed to the exterior. Accordingly, when this portion of the covering material is pressed, the covering material, and also the pad positioned below the covering material, are supported by the first flange of the case, thereby suppressing deformation of the covering material and the pad. As a result, the covering material and the pad at the periphery of the second flange of the cover are more effectively prevented from deforming downward so as to expose the internal structure to the exterior.

A fourth aspect of the present disclosure provides the lock release lever attachment structure of the first aspect, wherein a side plate is formed extending downward from the second flange so as to be insertable into the slit in a state in which the cover overlaps the case and is mounted to the case.

In this lock release lever attachment structure, a portion of the second flange overlapping the portion of the first flange formed with the slit is formed with the side plate extending downward from the second flange. Accordingly, when the second flange of the cover is placed on the first flange of the case, the side plate is inserted inside the slit, thereby inserting the edge of the covering material into the slit even more deeply.

A fifth aspect of the present disclosure provides the lock release lever attachment structure of the fourth aspect, wherein a rib is formed to a sidewall of the case below the slit so as to project outward from an outside face of the sidewall and to extend in the seat up-down direction.

In this lock release lever attachment structure, the rib that extends in the seat up-down direction is formed to the sidewall of the case at an outside face of a portion of the sidewall positioned below a portion of the first flange formed with the slit. Accordingly, when the edge of the covering material is inserted into the slit, the edge of the covering material abuts (is supported by) the rib, thereby reducing friction between the edge of the covering material and the sidewall, and facilitating insertion of the edge of the covering material.

A sixth aspect of the present disclosure provides the lock release lever attachment structure of the fourth aspect, wherein a stopper is formed to a sidewall of the case below the slit so as to project outward from an outside face of the sidewall and abut a front edge or a rear edge of the side plate to restrict swinging of the cover.

In this lock release lever attachment structure, there might be a concern of the cover swinging with respect to the case when the operation lever is operated. However, the front edge or the rear edge of the side plate of the cover abut the stopper formed projecting outward from the outside face of the sidewall of the case, thereby preventing or suppressing swinging of the cover.

As described above, the lock release lever attachment structure of the first aspect to the fifth aspect of the present disclosure reliably prevents the internal structure from being exposed to the exterior, while avoiding an increase in the number of components and a detrimental impact on the work efficiency.

The lock release lever attachment structure according to the sixth aspect of the present disclosure prevents the cover from swinging during operation of the operation lever.

BRIEF DESCRIPTION OF THE DRAWINGS

Exemplary embodiments of the present disclosure will be described in detail based on the following figures, wherein.

DETAILED DESCRIPTION

Explanation follows regarding a lock release lever attachment structure 10 according to an exemplary embodiment of the present disclosure, with reference to FIG. 1 to FIG. 8. Note that the drawings are schematic, with components having little relevance to the present disclosure being omitted from illustration in the drawings. Moreover, a covering material 140 is omitted from illustration in FIG. 2.

Lock Release Mechanism 11

Explanation follows regarding a lock release mechanism 11 that includes the lock release lever attachment structure 10 according to the present exemplary embodiment. In the following explanation, references to the front and rear, up and down, and left and right respectively refer to the front and rear in a seat front-rear direction, up and down in a seat up-down direction, and left and right in a seat width direction for a vehicle seat applied with the lock release lever attachment structure 10. In the drawings, the arrow FR, the arrow UP, and the arrow RH respectively point in a seat forward direction, a seat upward direction, and a seat right direction.

Figure 1:
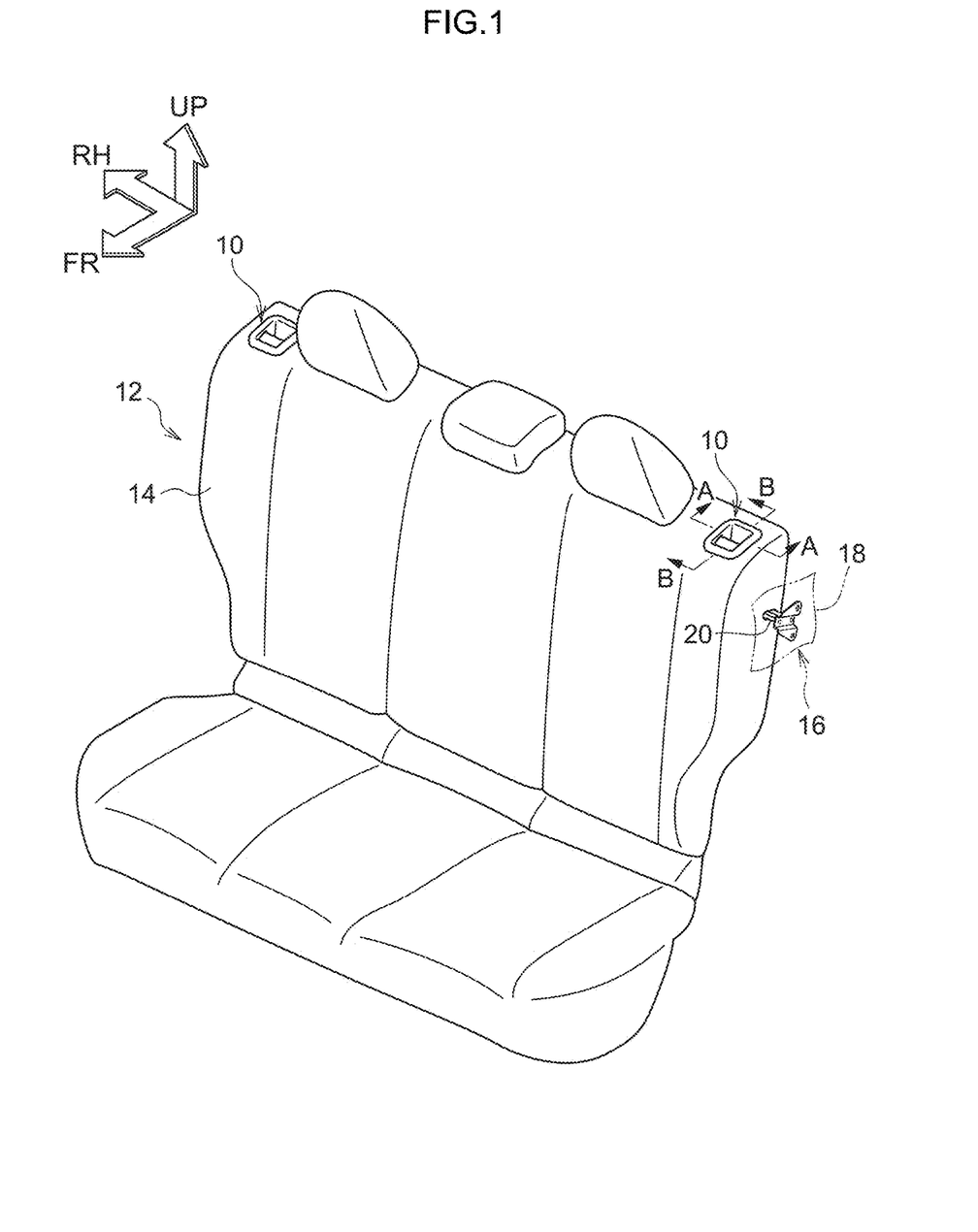
FIG. 1 is a perspective view illustrating schematic configuration of a rear seat according to an exemplary embodiment of the present disclosure.

As illustrated in FIG. 1, the lock release lever attachment structure 10 is, for example, provided at shoulder sections on both one end side (left side) and the other end side (right side) in the seat width direction of a seatback 14 of a rear seat 12 (an example of a vehicle seat).

The lock release mechanism 11 including the lock release lever attachment structure 10 is a mechanism that releases a locked (engaged) state of lock plates 200 (see FIG. 3) to strikers 20. The lock plates 200 are respectively provided to side sections on one end side and the other end side in the seat width direction of the seatback 14, and the strikers 20 are respectively provided to side walls 18 of a vehicle body 16.

The seatback 14 is retained at a predetermined backrest angle by locking the lock plates 200 to the strikers 20. When the locking of the lock plates 200 is released by the lock release mechanism 11, the seatback 14 becomes capable of tilting forward, for example.

Lock Plates 200

Figure 3:
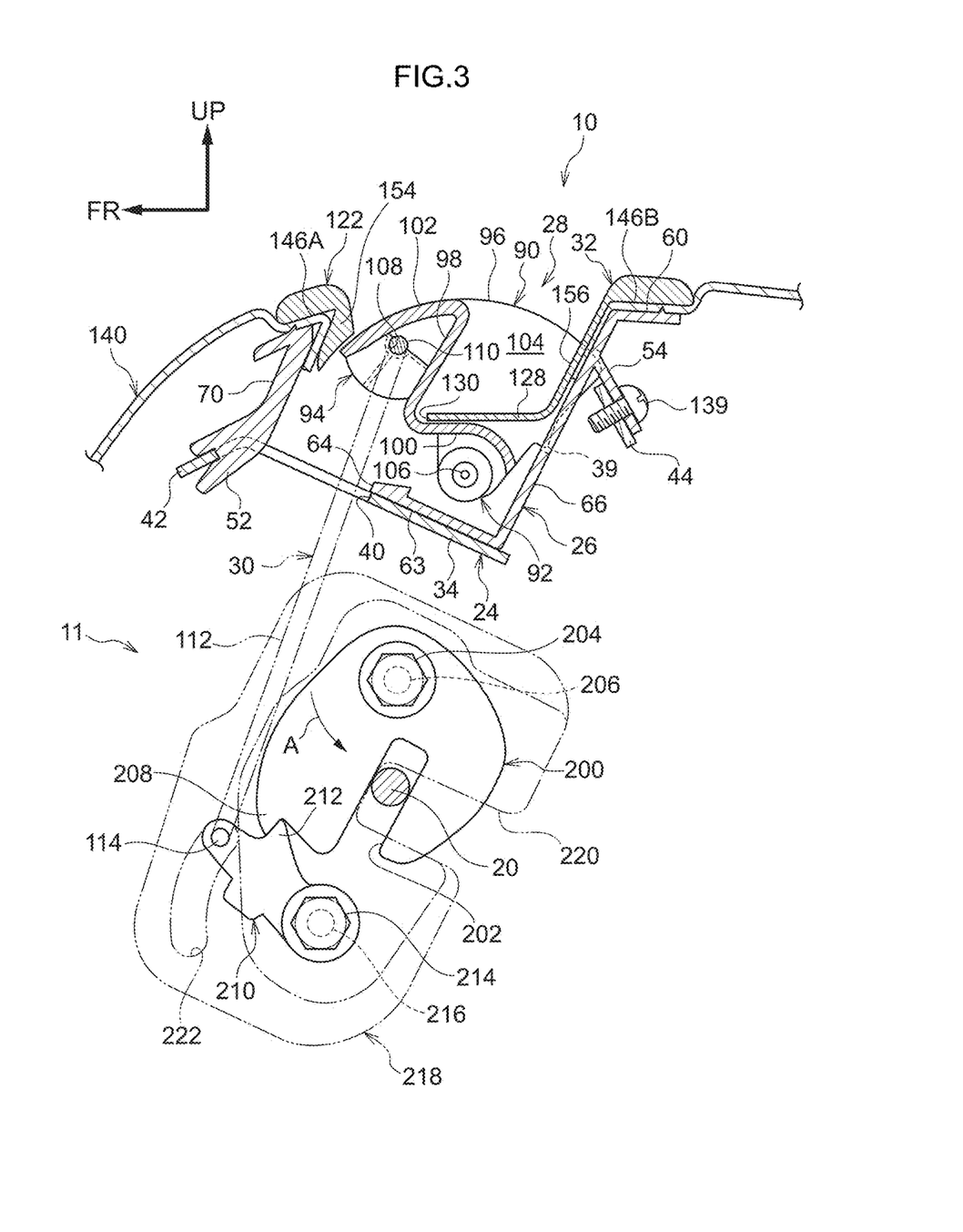
FIG. 3 is a cross-section taken along line B-B in FIG. 1, illustrating a locked state of a lock release mechanism according to an exemplary embodiment of the present disclosure.

Each of the lock plates 200 that is released from a locked state by the lock release mechanism 11 is formed in a plate shape with its thickness in the seat width direction. As illustrated in FIG. 3, the lock plate 200 is formed with a notch 202 for locking to the striker 20. The notch 202 is open toward the lower side, and is configured in an upturned U-shape as viewed along the seat width direction.

The lock plate 200 is supported by a shaft portion 206 of a screw 204 so as to be capable of swinging at a side of a seatback frame 22 (see FIG. 2) of the seatback 14. Specifically, the lock plate 200 is supported so as to be capable of swinging between a locked position (the position illustrated in FIG. 3) locked to the striker 20, and an unlocked position (the position illustrated in FIG. 4) where the locking to the striker 20 is released. The lock plate 200 is biased toward the unlocked position (see arrow A in FIG. 3) by a biasing member (not illustrated in the drawings) such as a spring.

Furthermore, a front side portion at a lower end portion of the lock plate 200 is formed with an engaged portion 208 that engages with an engaging portion 212 of an engagement plate 210. As illustrated in FIG. 3, in the lock plate 200, the engaged portion 208 engages with the engaging portion 212 of the engagement plate 210 at the locked position, so that the lock plate 200 remains in the locked position against the bias of the biasing member toward the unlocked position, and maintains the locked state to the striker 20.

Engagement Plate 210

The engagement plate 210 is formed in a plate shape with its thickness in the seat width direction. As illustrated in FIG. 3, the engaging portion 212 that engages with the engaged portion 208 of the lock plate 200 is formed at an upper portion of the engagement plate 210. The engaging portion 212 is configured with an upwardly protruding profile.

A rear portion of the engagement plate 210 is supported by a shaft portion 216 of a screw 214 so as to be capable of swinging at a side of the seatback frame 22 of the seatback 14. Specifically, the engagement plate 210 is supported so as to be capable of swinging between an engaged position (the position illustrated in FIG. 3) at which the engaging portion 212 is capable of engaging with the engaged portion 208 of the lock plate 200, and a disengaged position (the position illustrated in FIG. 4) at which the engaging portion 212 does not engage with the engaged portion 208 of the lock plate 200. The engagement plate 210 is biased toward the engaged position (see arrow B in FIG. 4) by a biasing member (not illustrated in the drawings) such as a spring. An attachment portion 114 of a rod 30 is attached to a front portion of the engagement plate 210 so as to be capable of swinging.

Note that the engagement plate 210 and the lock plate 200 are covered from the left side by a side cover 218. The side cover 218 is screwed to a side section of the seatback frame 22 of the seatback 14 by screws 204, 214 disposed above and below one another. A notch 220, into which the striker 20 can be inserted, is formed in the rear side of a height direction central portion of the side cover 218.

Lock Release Lever Attachment Structures

The lock release lever attachment structures 10 respectively disposed at the left side and the right side shoulder sections of the seatback 14 have the same configuration as one another, albeit inverted with left-right symmetry. Accordingly, the following explanation describes only the lock release lever attachment structure 10 disposed on the shoulder section on the left side of the seatback 14.

Figure 2:
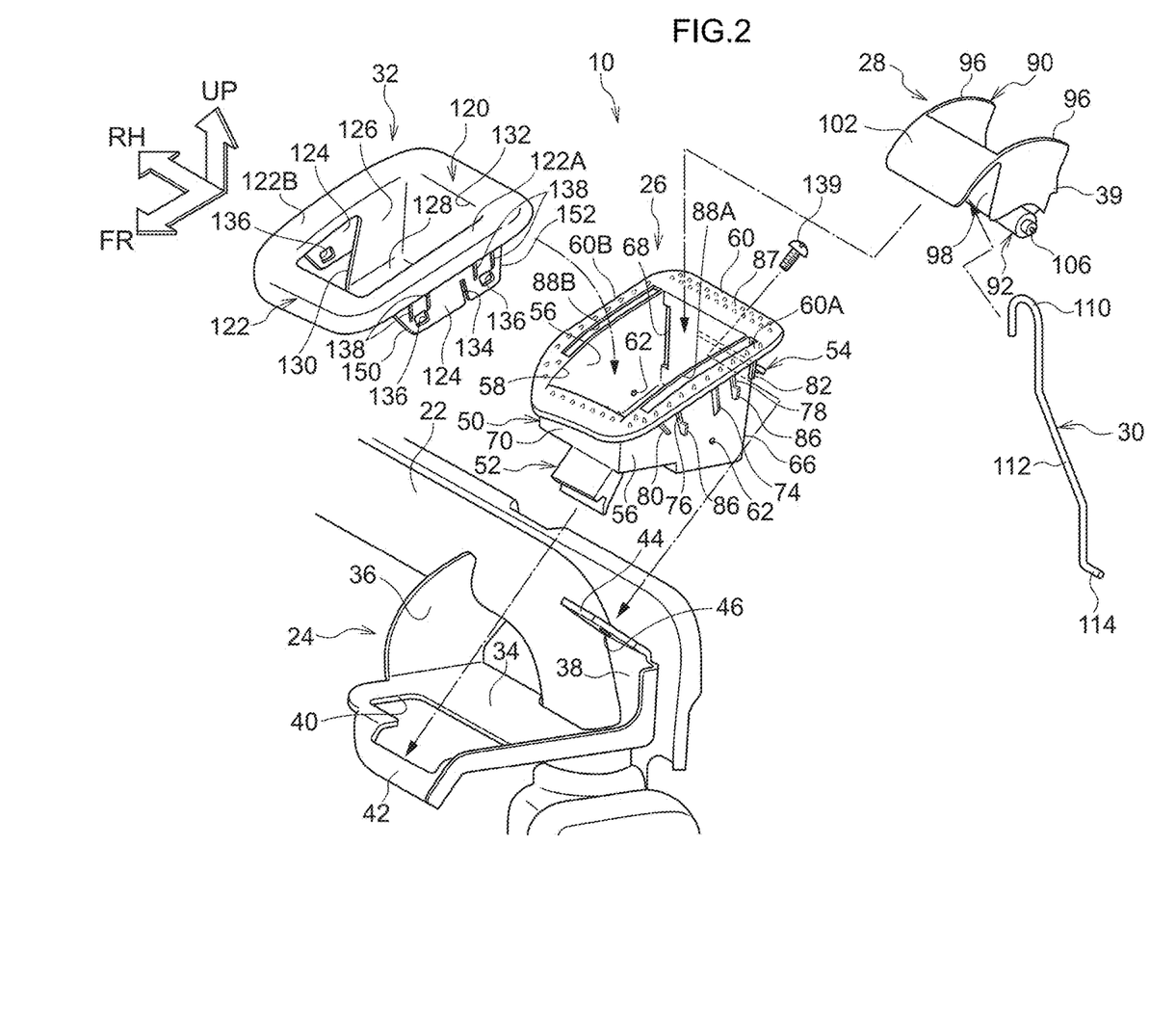
FIG. 2 is an exploded perspective view of a lock release lever attachment structure according to an exemplary embodiment of the present disclosure.

As illustrated in FIG. 2, the lock release lever attachment structure 10 includes a bracket 24, a case 26, an operation lever 28, the rod 30, and a cover 32. The bracket 24 is attached to the seatback frame 22. The case 26 is fixed to the bracket 24. The operation lever 28 is attached to the case 26 so as to be capable of swinging. The rod 30 couples the engagement plate 210 and the operation lever 28 together, as described later. The cover 32 is attached to an upper portion of the case 26.

Bracket 24

The bracket 24 is, for example, configured by a metal plate, and as illustrated in FIG. 2, is attached to the shoulder section on the left side of the seatback frame 22. The bracket 24 includes a bottom wall 34, a sidewall 36, and a rear wall 38. The sidewall 36 extends upward from a seat width direction inside end portion of the bottom wall 34. The rear wall 38 extends upward from the seat rear side end portion of the bottom wall 34. Moreover, an opening 40 used to secure moving space for the operation lever 28 as the operation lever 28 moves from a first position (the position illustrated in FIG. 3) to a second position (the position illustrated in FIG. 4), described later, is formed in a front portion of the bottom wall 34 (see FIG. 2).

A hooked portion 42 around which hooks a hook portion 52 of the case 26 is provided at a front portion of the bottom wall 34. The front portion of the bottom wall 34 is configured in a plate shape with its length in the left-right direction.

A plate-shaped fixing tab 44 is formed extending obliquely upward and forward from an upper end of the rear wall 38. A threaded hole 46, to which a screw 139, described later, is fastened, is formed in the fixing tab 44.

Case 26

As illustrated in FIG. 2, the case 26 includes a case body 50, the hook portion 52, and a fixing tab 54. The case body 50 is formed in a substantially box shape that is open upward. The hook portion 52 is provided to the case body 50 and hooks around the hooked portion 42 of the bracket 24. The fixing tab 54 is provided to the case body 50 and is fixed to the fixing tab 44 of the bracket 24.

Left and right sidewalls 56 of the case body 50 gradually decrease in height on progression from the rear toward the front. An upper opening 58 formed in the case body 50 and serving as a first opening faces obliquely upward and forward. A flange 60 is formed extending toward the outside at the periphery of the upper opening 58. Here, the "outside" refers to a direction away from the center of the upper opening 58 in plan view. The flange 60 is formed in a frame shape in plan view.

The left and right sidewalls 56 of the case body 50 are formed with support holes 62 that support the operation lever 28. A front portion of a bottom wall 63 (see FIG. 3) of the case body 50 is formed with an opening 64 (see FIG. 3) used to secure moving space for the operation lever 28 when the operation lever 28 moves from the first position (the position illustrated in FIG. 3) to the second position (the position illustrated in FIG. 4). The opening 64 is disposed above and overlapping the opening 40 of the bracket 24.

Slits 68 are formed in a right end and a left end of a rear wall 66 of the case body 50 in order to avoid interference with parts of the operation lever 28 (specifically a pair of sidewalls 96, described later) when the operation lever 28 is positioned at the first position (the position illustrated in FIG. 3).

As illustrated in FIG. 2 and FIG. 3, the fixing tab 54 provided to the rear wall 66 of the case body 50 is formed with an insertion hole for the screw 139 for attachment to the fixing tab 44 of the bracket 24.

A front wall 70 of the case body 50 is formed with the hook portion 52 projecting obliquely downward and forward from a lower end of the front wall 70. The hook portion 52 is formed bifurcated into two prongs, one above the other, at a leading end portion (front end portion). The hook portion 52 hooks around the hooked portion 42 of the bracket 24 from above and below during assembly.

As illustrated in FIG. 2, each of the pair of sidewalls 56 of the case body 50 is formed with a guide 74, anchors 76, 78, and positioners 80, 82, each projecting toward the outside. The guides 74 guide the cover 32 during assembly of the cover 32. The anchors 76, 78 are configured by a pair of ribs that anchor the cover 32 and support the cover 32 from below. The positioners 80, 82 are configured by a pair of stoppers that position front ends and rear ends of side plates 124 of the cover 32.

The guides 74 are substantially rectangular shaped portions extending up-down along the sidewalls 56. The guides 74 are inserted into slits 134 in the side plates 124 of the cover 32, described later, so as to guide the cover 32 to a predetermined position during assembly.

The pair of anchors 76, 78 are respectively formed at the front and rear of the guide 74 on each sidewall 56. The anchors 76, 78 are plate-shaped portions extending up-down along the sidewalls 56. Anchor projections 84 (see FIG. 5) that enter anchor holes 136 in the side plates 124 of the cover 32 during assembly, thereby anchoring the cover 32, are formed at upper ends of the anchors 76, 78. Support projections 86 that support lower ends of the side plates 124 of the cover 32 during assembly are formed at lower ends of the anchors 76, 78.

The positioners 80 are substantially rectangular shaped portions disposed in front of the anchors 76 on the sidewalls 56, and are formed so as to be inclined toward the rear on progression downward. The positioners 82 are substantially rectangular shaped plates disposed at the rear of the anchors 78 on the sidewalls 56, and are formed so as to be inclined toward the front on progression downward.

Plural bumps 87 are provided on an upper face around the flange 60 of the case 26. Slits 88A, 88B extending in the seat front-rear direction are formed in side flanges 60A, 60B configuring positions on both seat width direction sides of the flange 60.

Operation Lever 28

As illustrated in FIG. 2, the operation lever 28 includes a lever body 90, a supported portion 92, and a coupling portion 94 (see FIG. 3). The supported portion 92 is used to attach the lever body 90 to the case 26 such that the lever body 90 is capable of swinging. The coupling portion 94 is used to couple the rod 30 to the lever body 90. As illustrated in FIG. 2, the lever body 90 includes the pair of sidewalls 96, a front wall 98, a bottom wall 100 (see FIG. 3), and a curved wall 102.

The pair of sidewalls 96 are disposed at a spacing large enough to allow an operator to insert a finger therebetween. Namely, an insertion space 104 for finger insertion by the operator is formed between the pair of sidewalls 96.

Front ends of the pair of sidewalls 96 are connected together by the front wall 98. Lower ends of the pair of sidewalls 96 are connected together by the bottom wall 100. The insertion space 104 between the pair of sidewalls 96 is open upward and rearward of the body of the operation lever 28. Note that in an assembled state of the operation lever 28 and the cover 32 to the case 26 (see FIG. 3), the rear side of the insertion space 104 is closed off by a rear wall 156 of the cover 32. The operator finger is thus insertable into the insertion space 104 from above in such an assembled state.

Figure 4:
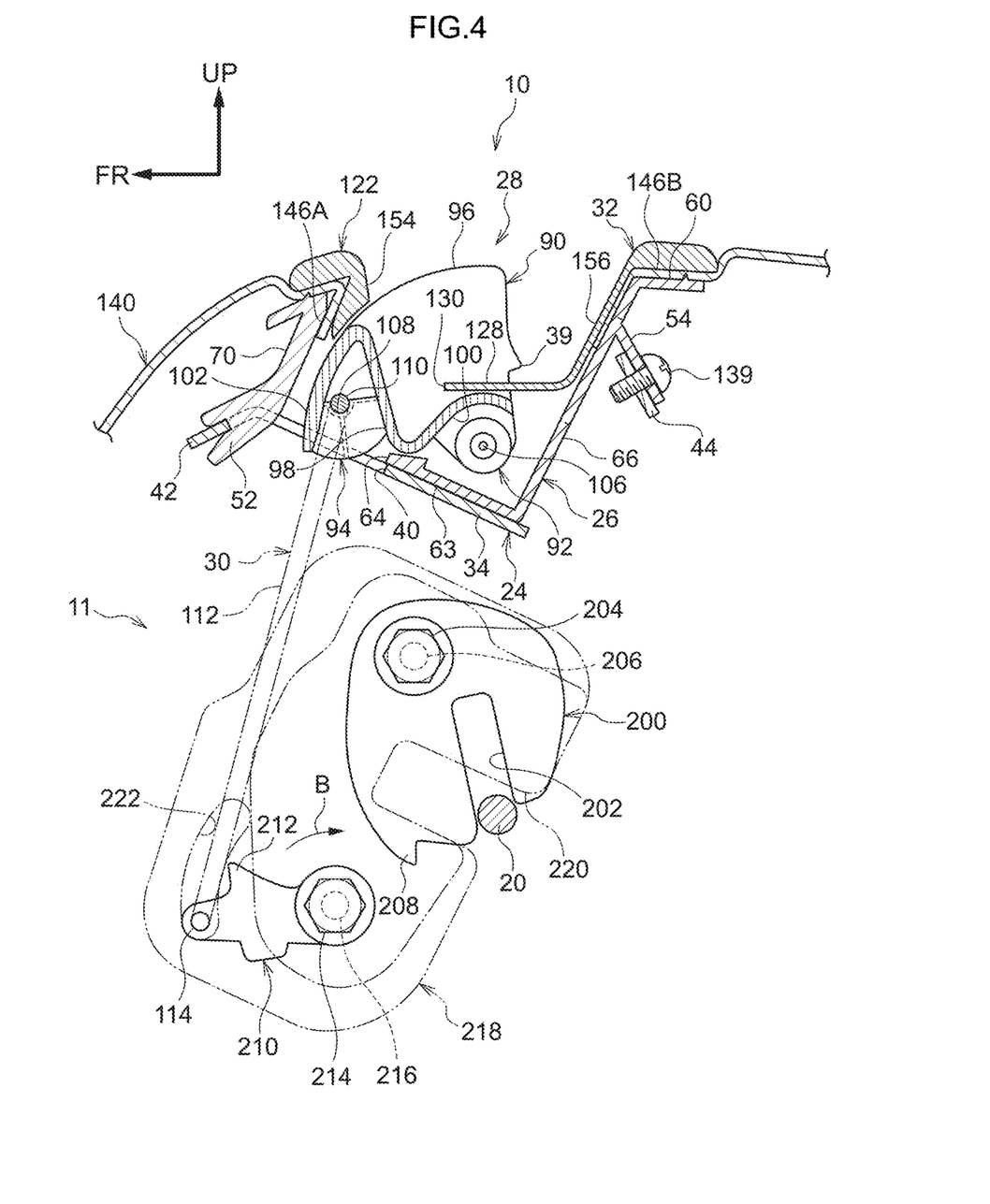
FIG. 4 is a cross-section taken along line B-B in FIG. 1, illustrating an unlocked state of a lock release mechanism according to an exemplary embodiment of the present disclosure.
Figure 5:
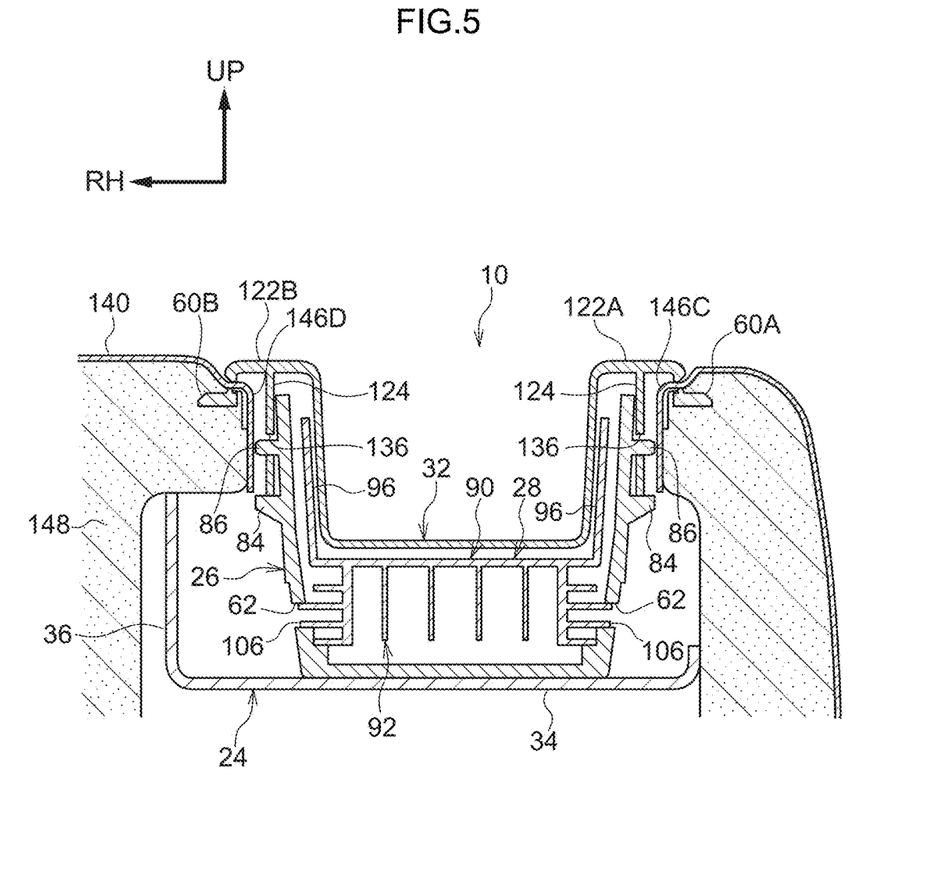
FIG. 5 is a cross-section taken along line A-A in FIG. 1.

The supported portion 92 is provided at a lower face side of the bottom wall 100. As illustrated in FIG. 2, FIG. 3, and FIG. 5, the supported portion 92 includes a pair of shafts 106 projecting from both seat width direction end portions (sidewalls 96) of the lever body 90 in plan view. Each shaft 106 is inserted into the corresponding support hole 62 of the case body 50, thereby supporting the operation lever 28 on the case 26 such that the operation lever 28 is capable of swinging in the front-rear direction about an axis along the seat width direction. Thus in the operation lever 28, the lever body 90 is capable of swinging in the front-rear direction about the supported portion 92 (a lower side portion). Specifically, the operation lever 28 is capable of swinging between the first position (the position illustrated in FIG. 3) and the second position (the position illustrated in FIG. 4).

The operation lever 28 is biased toward the first position by the biasing member (not illustrated in the drawings) described above biasing the engagement plate 210 toward the engaged position (see the arrow A direction in FIG. 3). The operation lever 28 is swing-operated forward toward the second position by the front wall 98 being pushed forward by the finger inserted into the insertion space 104. In this manner, the front wall 98 of the operation lever 28 functions as an operation face.

Moreover, as illustrated in FIG. 3, the curved wall 102 of the lever body 90 juts out toward the front from an upper end of the front wall 98. The curved wall 102 is formed in a circular arc shape extending along the direction of swing about the shafts 106 as viewed along the seat width direction.

As illustrated in FIG. 3, the coupling portion 94 is a portion that is coupled to the rod 30, and is disposed between the curved wall 102 and the front wall 98. A coupling hole 108 through which the rod 30 is inserted is formed passing through the coupling portion 94 in the seat width direction.

Rod 30

As illustrated in FIG. 2, the length of the rod 30 is along the up-down direction. Specifically, the rod 30 includes a coupled portion 110, a body 112, and an attachment portion 114. The coupled portion 110 is coupled to the coupling portion 94 of the operation lever 28. The attachment portion 114 is coupled to the engagement plate 210.

The coupled portion 110 is formed at an upper portion of the rod 30, and is curved in a circular arc shape as viewed from the seat front. The coupled portion 110 is inserted through the coupling hole 108 in the coupling portion 94, thereby coupling the rod 30 to the operation lever 28.

The body 112 is formed at a lower side portion of the coupled portion 110 of the rod 30, and extends from a left side (one seat width direction side) of the coupled portion 110 toward the seat lower side.

The attachment portion 114 extends from a lower end of the body 112 toward the left, and is attached to a front portion of the engagement plate 210 so as to be capable of swinging. As illustrated in FIG. 3, the attachment portion 114 is guided by a circular arc shaped elongated hole 222 formed in the side cover 218.

Swing operation of the operation lever 28 toward the front moves the rod 30 downward. The attachment portion 114 releases the locked state of the engagement plate 210 to the lock plate 200, thereby releasing the locked state of the lock plate 200 to the striker 20 (see FIG. 4).

Cover 32

The cover 32 is attached to the case 26 so as to cover parts of the operation lever 28 (namely, the pair of sidewalls 96 and the bottom wall 100) housed in the case 26. In an attached state of the cover 32 to the case 26, the curved wall 102 and the front wall 98 of the operation lever 28 are in an exposed state (see FIG. 3).

As illustrated in FIG. 2, the cover 32 includes a cover body 120, a flange 122, and a pair of the side plates 124. The cover body 120 is formed substantially in a box shape that is open upward and forward. The flange 122 serves as a second flange.

An opening 130 (a notch, see FIG. 3) to secure a placement space for the operation lever 28 is formed in front portions of sidewalls 126 and in a bottom wall 128 of the cover body 120.

The flange 122 is formed at a peripheral edge of an upper opening 132, serving as a second opening, of the cover body 120. The flange 122 is formed in a frame shape in plan view. As illustrated in FIG. 3 to FIG. 5, a covering material 140 that covers a surface of a urethane pad 148 of the seatback 14 is pinched between the flange 122, and the flange 60 of the case 26.

The pair of side plates 124 are respectively formed projecting downward from lower faces of the corresponding side flanges 122A, 112B configuring left and right side portions of the flange 122. The pair of side plates 124 are disposed at the seat width direction outsides of the respective sidewalls 126 such that gaps are present between the pair of side plates 124 and the respective sidewalls 126 of the cover body 120. As illustrated in FIG. 5, these gaps configure placement spaces in which the pair of sidewalls 96 of the operation lever 28 and the sidewalls 56 of the case 26 are disposed.

The slits 134 are formed at substantially front-rear direction central portions of the respective side plates 124, and extend upward from lower ends of the side plates 124. The guides 74 of the case 26 enter the slits 134 during assembly. Moreover, in each of the side plates 124, the anchor holes 136 are formed in a pair at the front and rear of the slit 134. The anchor projections 84 of the case 26 are inserted into the respective anchor holes 136 during assembly. A pair of guide protrusions 138, each extending in the up-down direction, are formed on outside faces of the side plates 124 at the upper sides of each anchor hole 136.

A front end face 150 and a rear end face 152 of each side plate 124 are configured so as to be abutted by the positioners 80, 82 of the case 26 during assembly.

Locking Operation and Unlocking Operation of the Lock Plates 200

Next, explanation follows regarding a locking operation and an unlocking operation of the lock plates 200 of the present exemplary embodiment.

The locking operation of the lock plates 200 is, for example, performed in the following manner.

Prior to the start of the locking operation, the locked state of the lock plates 200 has been released, and for example, the seatback 14 has been tilted forward. In this state, each lock plate 200 is biased toward the unlocked position (the position illustrated in FIG. 4) by the biasing member (not illustrated in the drawings), such that each lock plate 200 is positioned at the unlocked position. Moreover, the engagement plate 210 is biased toward the engaged position (the position illustrated in FIG. 3) by the biasing member (not illustrated in the drawings), such that the engagement plate 210 and the operation lever 28 are positioned at the engaged position (the position illustrated in FIG. 3) and the first position (the position illustrated in FIG. 3), respectively.

In the locking operation of the present exemplary embodiment, for example, the operator swings the forward-tilted seatback 14 toward the rear so as to lift the seatback 14. When this is performed, the striker 20 enters the notch 202 of the lock plate 200 (see FIG. 4), and the striker 20 pushes and moves the lock plate 200 toward the locked position (the position illustrated in FIG. 3). When this occurs, the engaged portion 208 of the lock plate 200 rides up over the engaging portion 212 of the engagement plate 210 and is engaged by the engaging portion 212 (see FIG. 3). The lock plate 200 is thereby locked to the striker 20, and the seatback 14 is retained at the predetermined backrest angle.

The unlocking operation of the lock plate 200 is, for example, performed in the following manner.

In the unlocking operation of the present exemplary embodiment, for example, the operator pushes the front wall 98 of the operation lever 28 forward so as to swing operate the operation lever 28 forward. The forward swing operation of the operation lever 28 swings the operation lever 28 toward the second position (the position illustrated in FIG. 4), and the rod 30 moves downward.

When the rod 30 moves downward, the engagement plate 210 moves to the disengaged position (the position illustrated in FIG. 4), and the engagement of the engaging portion 212 of the engagement plate 210 to the engaged portion 208 of the lock plate 200 is released. When the engagement of the engaging portion 212 to the engaged portion 208 is released, the lock plate 200 is moved toward the unlocked position by the biasing force of the biasing member (not illustrated in the drawings). The locking of the lock plate 200 to the striker 20 is thereby released, allowing the seatback 14 to be tilted forward.

Operation Lever 28 Assembly Method

First, the bottom wall 63 of the case body 50 of the case 26 is placed on the bottom wall 34 of the bracket 24 that is fixed to the seatback frame 22. When this is performed, the hook portion 52 of the case 26 hooks around the hooked portion 42 of the bracket 24 from above and below. The fixing tab 54 of the case 26 is superimposed on the fixing tab 44 of the bracket 24, and the case 26 is fixed to the bracket 24 by screwing the screw 139 into the threaded hole 46 in the fixing tab 44 from above through an insertion hole, not illustrated in the drawings, in the fixing tab 54.

The opening 64 of the case 26 is thus disposed above the opening 40 of the bracket 24.

Figure 6:
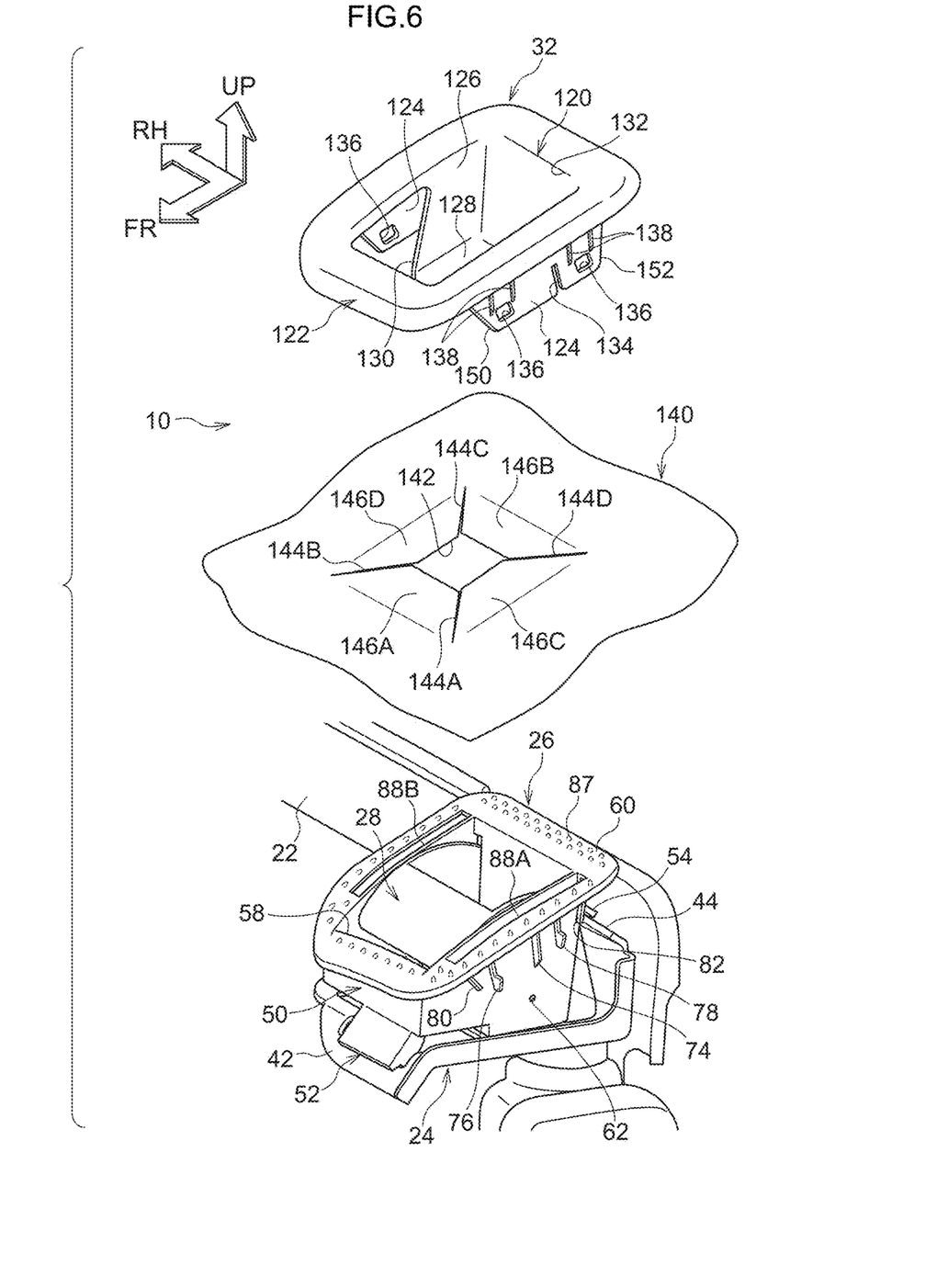
FIG. 6 is an exploded perspective view illustrating an attached state of a case in an assembly process of a lock release lever attachment structure according to an exemplary embodiment of the present disclosure.

Next, as illustrated in FIG. 6, the operation lever 28 is inserted inside the case body 50 through the upper opening 58 in the case 26. The shafts 106 of the operation lever 28 are inserted into the support holes 62 in the case body 50 of the case 26, thereby attaching the operation lever 28 to the case 26 so as to be capable of swinging toward the front and rear about the shafts 106.

The rod 30 is coupled to the operation lever 28 by inserting the coupled portion 110 of the rod 30 into the coupling hole 108 in the coupling portion 94 formed at the lower side of the lever body 90 of the operation lever 28. The coupled portion 110 is inserted into the coupling hole 108 from the lower side, through the opening 40 in the bracket 24 and the opening 64 in the case 26. A biasing force from the biasing member biasing the engagement plate 210 accordingly acts on the operation lever 28 via the rod 30, such that the operation lever 28 is normally pushed toward the rear wall 66 side of the case 26. In this state, the operation lever 28 is restricted from tilting toward the rear due to engagement projections 39 abutting lower ends of the slits 68. Moreover, parts of the sidewalls 96 of the operation lever 28 project toward the rear side through the slits 68.

Next, the covering material 140 is inserted into the case 26. Note that as illustrated in FIG. 6, a rectangular hole 142 is formed in the covering material 140 at a position corresponding to the placement position of the operation lever 28. Cuts 144A to 144D are respectively formed from the four corners of the hole 142 in four directions: diagonally forward to the left, diagonally forward to the right, diagonally rearward to the left, and diagonally rearward to the right. A portion of the covering material 140 surrounded by a hole edge and the cuts 144A, 144B is referred to as a front side edge 146A. A portion of the covering material 140 surrounded by a hole edge and the cuts 144C, 144D is referred to as a rear side edge 146B. A portion of the covering material 140 surrounded by a hole edge and the cuts 144A, 144D is referred to as a left side edge 146C. A portion of the covering material 140 surrounded by a hole edge and the cuts 144B, 144C is referred to as a right side edge 146D.

Figure 7:
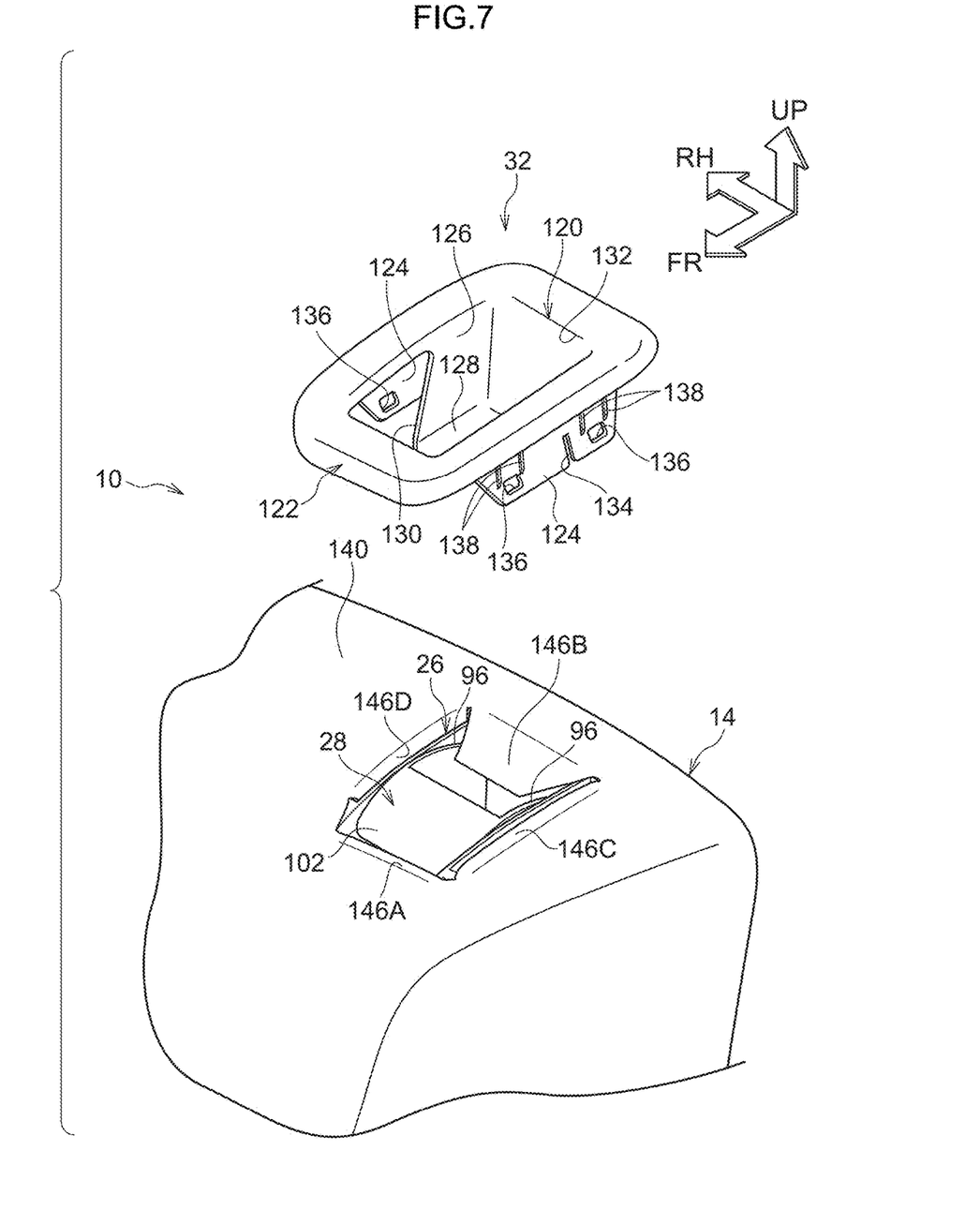
FIG. 7 is an exploded perspective view illustrating an attached state of a covering material in an assembly process of a lock release lever attachment structure according to an exemplary embodiment of the present disclosure.

As illustrated in FIG. 7, after placing the covering material 140 over the case 26 so as to position the hole 142 in the covering material 140 above the upper opening 58 of the case 26, the left side edge 146C and the right side edge 146D are then respectively inserted into the slits 88A, 88B of the case 26. The front side edge 146A and the rear side edge 146B of the covering material 140 are folded inward from the upper opening 58 in the case body 50 along the front wall 70 and the rear wall 66.

Figure 8:
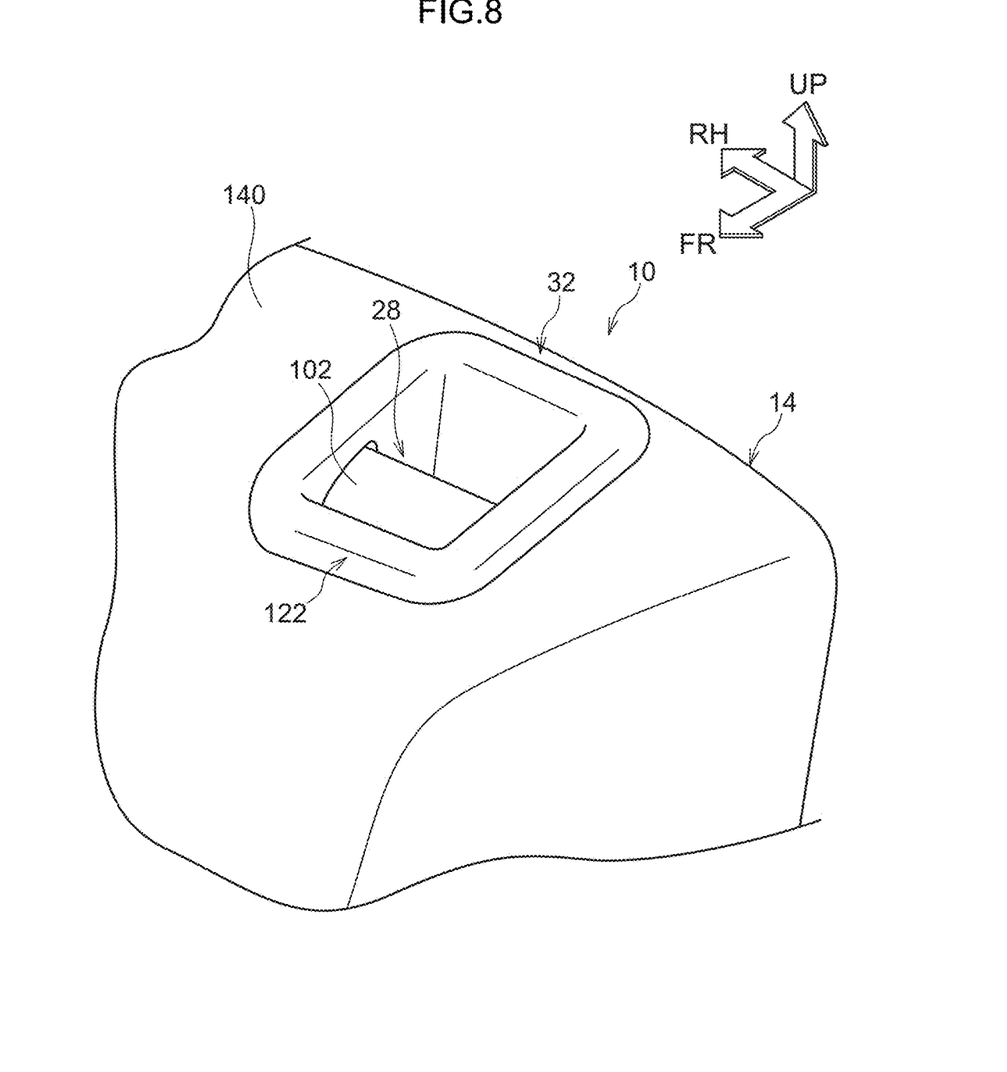
FIG. 8 is a perspective view illustrating an attached state of a cover in an assembly process of a lock release lever attachment structure according to an exemplary embodiment of the present disclosure.

Then, as illustrated in FIG. 8, the cover 32 is attached to the case 26 from above the covering material 140.

The pair of side plates 124 of the cover 32 are respectively inserted into the slits 88A, 88B in the case 26. The guides 74 of the case 26 thus enter the slits 134 in the side plates 124, guiding the cover 32 to a predetermined position. The side plates 124 are inserted into the slits 88A, 88B until the flange 122 of the cover 32 abuts the flange 60 of the case 26. The anchor projections 84 of the case 26 are thus fitted into the anchor holes 136 in the side plates 124, thereby fixing the cover 32 to the case 26. Lower ends of the side plates 124 are supported by the support projections 86.

When this is performed, the left side edge 146C and the right side edge 146D of the covering material 140 are pushed downward by the pair of side plates 124 inserted into the slits 88A, 88B. In particular, this pushing is facilitated by the guide protrusions 138 provided to the outside faces of the side plates 124.

At the same time, the cover body 120 is inserted through the upper opening 58 in the case 26. When this occurs, the sidewalls 126 and the bottom wall 128 of the cover body 120 are inserted into the insertion space 104 of the lever body 90 attached to the case body 50 such that interference with the operation lever 28 is avoided. Moreover, the rear side edge 146B of the covering material 140 is gripped between the rear wall 156 of the cover body 120 and the rear wall 66 of the case body 50. Similarly, the front side edge 146A of the covering material 140 is gripped between a front wall 154 of the cover body 120 and the front wall 70 of the case body 50.

Due to the cover 32 being anchored (fixed) to the case 26, the covering material 140 positioned over the flange 60 of the case 26 is gripped by the flange 122 of the cover 32.

The position of the covering material 140 is further suppressed from slipping by the bumps 87 formed on the flange 60.

OPERATION AND ADVANTAGEOUS EFFECTS OF THE PRESENT EXEMPLARY EMBODIMENT

Next, explanation follows regarding operation and advantageous effects of the present exemplary embodiment.

In the configuration of the present exemplary embodiment, as illustrated in FIG. 7, the front side edge 146A and the rear side edge 146B of the covering material 140 are folded inward through the upper opening 58 of the case 26, and the left side edge 146C and the right side edge 146D of the covering material 140 are inserted into the slits 88A, 88B provided in the side flanges 60A, 60B of the case 26. This thereby enables a good length of the respective edges 146A to 146D to be inserted downward (see FIG. 5). As a result, the edges 146A to 146D are not pulled out from below the flange 122 of the cover 32 so as to expose the internal structure, even if a downward load input at the periphery of the cover 32 of the seatback 14 after assembly deforms the urethane pad 148 downward so as to pull on the covering material 140. This due to a sufficient length of each of the edges 146A to 146D of the covering material 140 having been inserted into the upper opening 58 or into the slits 88A, 88B. Moreover, a sufficient length of the edges 146A to 146D is positioned at the periphery of the case body 50 of the case 26. Accordingly, the internal structure of the lock release lever attachment structure 10 (for example the case body 50) is not exposed to the exterior even if the urethane pad 148 supporting the covering material 140 is deformed by input load.

In particular, in the present exemplary embodiment, the slits 88A, 88B are provided to the side flanges 60A, 60B positioned at both end portions (both seat width direction end portions) of the shafts 106 of the operation lever 28 disposed inside the upper opening 58 of the case 26. Accordingly, although the presence of the operation lever 28 (shafts 106) prevents insertion of a sufficient length of the left side edge 146C and the right side edge 146D of the covering material 140 inside the case body 50 through the upper opening 58 in the case 26, the covering material 140 (left side edge 146C, right side edge 146D) can still be extended downward by a sufficient length by inserting the left side edge 146C and the right side edge 146D downward through the respective slits 88A, 88B provided in the side flanges 60A, 60B.

Moreover, the covering material 140 can be pushed in smoothly at a separation from the sidewalls 56, due to forming the anchors 76, 78 on the outside faces of the sidewalls 56 of the case body 50.

The pair of side plates 124 are provided extending downward from the flange 122 of the cover 32. When attaching the cover 32 to the case 26, the pair of side plates 124 are inserted through the respective slits 88A, 88B. The cover 32 is thus fixed to the case 26, and the left side edge 146C and the right side edge 146D of the covering material 140 can be pushed even further downward.

As illustrated in FIG. 5, the width of the flange 60 of the case 26 in the direction away from the upper opening 58 (for example, the width in the seat width direction in the case of the side flanges 60A, 60B) (referred to hereafter as the "flange 60 width") is wider than the width of the flange 122 of the cover 32 in the direction away from the upper opening 132 (referred to hereafter as the "flange 122 width"). As a result, when the cover 32 has been mounted to an upper portion of the case 26, outside end portions of the flange 60 are positioned at the outside of the flange 122 in plan view.

Accordingly, as illustrated in FIG. 5, when a downward load is input to the covering material 140 at the periphery of the flange 122 (for example, the side flanges 122A, 122B) of the cover 32, outside end portions (portions wider than the flange 122 of the cover 32) of the flange 60 (for example, the side flanges 60A, 60B) of the case 26 support the covering material 140 and the urethane pad 148, thus enabling deformation of the covering material 140 and the urethane pad 148 to be suppressed. This also enables the internal structure (for example, the case body 50) of the lock release lever attachment structure 10 to be suppressed from being exposed to the exterior.

Moreover, due to providing the sidewalls 56 of the case 26 with the positioners 80, 82 that abut the front ends and rear ends of the side plates 124 of the cover 32, the cover 32 can be suppressed from swinging due to swinging of the operation lever 28.

Moreover, with this configuration, an approach can be adopted in which the slits 88A, 88B are simply provided to the flange 60 of an existing case 26, and the side plates 124 are simply provided below the flange 122 of an existing cover 32. This thereby enables the adoption of an approach that does not increase the number of components of an existing configuration.

Moreover, during assembly, the left side edge 146C and the right side edge 146D of the covering material 140 are simply inserted into the slits 88A, 88B in the case 26, followed by insertion of the side plates 124 of the cover 32. Detriment to work efficiency during assembly as a result of adopting the present configuration of the lock release lever attachment structure 10 is thus suppressed.

Other

Note that in the present exemplary embodiment, the width of the flange 60 of the case 26 is set greater than the width of the flange 122 of the cover 32. However, there is no limitation thereto.

Moreover, although in the present exemplary embodiment the slits 88A, 88B are formed in the side flanges 60A, 60B of the case 26, slits may be formed in seat front-rear direction portions of the flange 60. There is no particular limitation regarding which parts of the flange 60 are formed with the slits. However, it is preferable to at least form slits at both end portion sides of the shafts 106 of the operation lever 28.

Moreover, the (seat width direction) heights of the anchors 76, 78 and the guides 74 provided on the outside faces of the sidewalls 56 of the case body 50 of the case 26 are preferably no greater than a height of the seat width direction width of the slits 88A, 88B minus the thickness of the covering material 140. This is in order to ensure easy insertion of the covering material 140 into the slits 88A, 88B. The (seat width direction) heights of the anchors 76, 78 and the guides 74 are even more preferably no greater than a height of the seat width direction width of the slits 88A, 88B minus the seat width direction thickness of the covering material 140 and the respective side plates 124. This is in order to ensure easy insertion of the side plates 124 into the slits 88A, 88B when the covering material 140 has already been inserted.

What is claimed is:

1. A lock release lever attachment structure comprising:
a case that includes a substantially box-shaped case body, an upper portion of which opens as a first opening, and a first flange formed extending outward from the first opening, a slit being formed so as to penetrate through at least a portion of the first flange in a seat up-down direction along a peripheral edge of the first opening, and the case being attached to a bracket provided to a seatback frame such that the first opening is open in a seat upward direction;
an operation lever that is axially supported so as to be capable of swinging between a pair of sidewalls of the case body and that releases a locked state of a seatback by being swing-operated; and
a cover that includes a substantially box-shaped cover body, an upper portion of which opens as a second opening and that restricts a swing range of the operation lever, and a second flange formed extending outward from a peripheral edge of the second opening, the first opening and the second opening being placed in communication with each other by inserting the cover body into the case body through the first opening and fixing the cover body inside the case body, and an edge of a covering material that covers a surface of the seatback being inserted into the slit and gripped by the first flange and the second flange.

2. The lock release lever attachment structure of claim 1, wherein the slit is formed in the first flange at both end sides of a swing shaft of the operation lever.

3. The lock release lever attachment structure of claim 1, wherein a width of the first flange is wider than a width of the second flange at a portion of the second flange overlapping the first flange.

4. The lock release lever attachment structure of claim 1, wherein a side plate is formed extending downward from the second flange so as to be insertable into the slit in a state in which the cover overlaps the case and is mounted to the case.

5. The lock release lever attachment structure of claim 4, wherein a rib is formed to a sidewall of the case below the slit so as to project outward from an outside face of the sidewall and to extend in the seat up-down direction.

6. The lock release lever attachment structure of claim 4, wherein a stopper is formed to a sidewall of the case below the slit so as to project outward from an outside face of the sidewall and abut a front edge or a rear edge of the side plate to restrict swinging of the cover.

* * * * *